US 8,006,968 B2

(12) United States Patent
Freeland

(10) Patent No.: US 8,006,968 B2
(45) Date of Patent: Aug. 30, 2011

(54) RECONFIGURABLE WORKPIECE SUPPORT FIXTURE

(75) Inventor: Mark A. Freeland, Federal Way, WA (US)

(73) Assignee: The Boeing Company, Chicago, IL (US)

(*) Notice: Subject to any disclaimer, the term of this patent is extended or adjusted under 35 U.S.C. 154(b) by 193 days.

(21) Appl. No.: 12/546,937

(22) Filed: Aug. 25, 2009

(65) Prior Publication Data

US 2009/0322008 A1   Dec. 31, 2009

Related U.S. Application Data

(62) Division of application No. 11/134,775, filed on May 20, 2005, now Pat. No. 7,584,947.

(51) Int. Cl.
*B25B 11/00* (2006.01)
*B23Q 3/00* (2006.01)

(52) U.S. Cl. .......... 269/296; 269/21; 269/297; 269/298; 269/299

(58) Field of Classification Search .......... 269/296–299, 269/266, 21
See application file for complete search history.

(56) References Cited

U.S. PATENT DOCUMENTS

| | | |
|---|---|---|
| 1,110,409 A | 9/1914 | Sutherland, Jr. |
| 2,198,765 A | 4/1940 | Featherstone et al. |
| 2,729,040 A | 1/1956 | Wallace et al. |
| 4,527,783 A | 7/1985 | Collora et al. |
| 4,640,501 A | 2/1987 | Poland |
| 4,894,903 A | 1/1990 | Woods |
| 5,048,804 A | 9/1991 | Ito |
| 5,094,282 A | 3/1992 | Suzuki et al. |
| 5,163,793 A | 11/1992 | Martinez |
| 5,249,785 A | 10/1993 | Nelson et al. |
| 5,615,483 A | 4/1997 | Micale et al. |
| 6,121,781 A | 9/2000 | Martinez |
| 6,430,796 B1 | 8/2002 | Jones et al. |
| 6,449,848 B1 | 9/2002 | Crocker et al. |
| 6,488,060 B1 | 12/2002 | Giovanni |
| 6,502,808 B1 | 1/2003 | Stone et al. |
| 6,558,489 B2 | 5/2003 | Dolker et al. |
| 6,598,866 B2 | 7/2003 | Helm et al. |
| 6,607,336 B1 | 8/2003 | Suzuki |
| 6,764,434 B1 | 7/2004 | Volk |
| 2003/0000077 A1 | 1/2003 | Miller et al. |
| 2004/0034977 A1 | 2/2004 | Heck et al. |
| 2004/0146383 A1 | 7/2004 | Behnke |

FOREIGN PATENT DOCUMENTS

| | | |
|---|---|---|
| EP | 0179957 A1 | 5/1986 |
| FR | 2622821 A1 | 5/1989 |
| GB | 1315692 | 5/1973 |
| GB | 2136727 A | 9/1984 |
| GB | 2214454 A | 9/1989 |
| JP | 63208459 A | 8/1988 |
| JP | 04315537 A | 11/1992 |

*Primary Examiner* — Bryan R Muller
(74) *Attorney, Agent, or Firm* — Yee & Associates, P.C.

(57) ABSTRACT

An exemplary reconfigurable workpiece support fixture according to an embodiment of the present invention includes a base, and a plurality of spaced-apart plates are removably attachable to the base. Each plate defines a plurality of notches along an angular profile. A plurality of spaced-apart manifolds are receivable in the plurality of notches, and each manifold spans across the plurality of plates. A plurality of attachment devices are removably attachable to the plurality of manifolds.

19 Claims, 4 Drawing Sheets

RECONFIGURABLE WORKPIECE SUPPORT FIXTURE

This application is a divisional of application Ser. No. 11/134,775, filed May 20, 2005, now U.S. Pat. No. 7,584,947.

BACKGROUND

During machining, polishing, grinding, or other fabrication processes performed on a workpiece, the workpiece is typically held securely in place on a support fixture. This secure placement on the support fixture is typically accomplished by holding devices, such as suction cups, that securely hold one side of the workpiece onto the workpiece support fixture. This arrangement permits end effectors, cutters, or other machining devices to act upon another side of the workpiece without interference by the holding devices.

It is common for design of a part to be revised during the life cycle of the part, thereby entailing changes in the fabrication and processing of the part. It is generally more cost-effective to reconfigure the workpiece support fixture to accommodate several revised designs of a part than it is to procure a separate workpiece support fixture for each different revised part. It is also desirable to use a workpiece support fixture for fabrication of more than one part thereon, thereby increasing the return on investment in the workpiece support fixture. As a result, changes may be made to configuration of the workpiece support fixture to accommodate revisions to designs of parts fabricated thereon or to accommodate fabrication of different parts thereon.

Therefore, it would be desirable to design workpiece support fixtures that are reconfigurable. One currently known reconfigurable workpiece support fixture provides a base with a number of stations. Each station includes a clamp block, and a frame element of predetermined profile may be clamped in the clamp block in either of two orientations. Each frame element includes a number of suction cups with plumbing internal to the frame element. Suction to the suction cups of each separate frame element is controlled by a separate valve for each frame element. The several valves are provided on the base, and each separate valve is connected to the internal plumbing of its associated frame element. The workpiece support may be configured for a symmetric component by unclamping and rotating the frame elements through 180 degrees. The workpiece support may also be reconfigured for different profiles by selecting a set of appropriate frame elements from a library of frame elements.

Reconfiguring such a known workpiece support thus entails use of clamping blocks, complex frame elements with internal plumbing, a separate valve connected to the internal plumbing of each complex frame element, and a library of such complex frame elements. Fabricating such a complex workpiece support and a library of complex frame elements for different profiles is expensive. Moreover, reconfiguring such a known workpiece by unclamping and rotating frame elements, or retrieving a set of appropriate frame elements from a library of frame elements, and connecting internal plumbing of each frame element to its associated valve is time and labor intensive. Further, storage of a library of frame elements uses facility space for storage of unused fixture components, thereby preventing that facility space from being used for productive use.

Moreover, advances in manufacturing technology such as determinant assembly still entail stabilizing a workpiece on a workpiece support fixture. Determinant assembly is a method of self-indexing of detail parts to each other to create an assembly. By using determinant assembly, parts can be assembled with a minimum number of tools. However, the tooling and machinery that are used to accomplish determinant assembly have been complex and capital intensive.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the problems described above in the Background have been reduced or eliminated, while other embodiments are directed to other improvements.

Embodiments of reconfigurable workpiece support fixtures are reconfigurable to support a variety of workpieces of different sizes and configurations during manufacturing, fabrication, assembly operations, or the like. Through use of modular concepts, reconfigurable workpiece support fixtures according to embodiments of the present invention advantageously may be built more simply, may be more flexible, and may be modified for different configurations more quickly than known fixtures. Moreover, embodiments of the present invention may be used to support determinant assembly operations, if desired.

An exemplary reconfigurable workpiece support fixture according to an embodiment of the present invention includes a base, and a plurality of spaced-apart plates are removably attachable to the base. Each plate defines a plurality of notches along an angular profile. A plurality of spaced-apart manifolds are receivable in the plurality of notches, and each manifold spans across the plurality of plates. A plurality of attachment devices are removably attachable to the plurality of manifolds.

According to an exemplary aspect, one dimension, such as length, of the workpiece support fixture may be reconfigured by changing the number of attachment devices that are removably attached to the plurality of manifolds. For example, each manifold may define a plurality of spaced-apart receptacles, and each receptacle is configured to receive any of the plurality of attachment devices therein. The receptacles that are within the edges of a workpiece may have the attachment devices removably received therein. The receptacles that are beyond the edges of the workpiece may each removably receive in sealing engagement therewith a receptacle cover. As a result, one dimension of the workpiece support fixture may be quickly and easily reconfigured by use of attachment devices within the edges of the workpiece and receptacle covers to seal the receptacles beyond the edges of the workpiece. Such a reconfiguration of this dimension of the workpiece support fixture is advantageous when the attachment devices include suction cups that are connected to a vacuum source.

According to another exemplary aspect, another dimension, such as width, of the workpiece support fixture may be reconfigured by use of different headers that define different numbers of notches. Alternately, the dimension, such as width, of the workpiece support fixture may be reconfigured by changing the number of manifolds that are received in the notches.

According to another exemplary aspect, angular profile along curved, upper surface of the headers contributes to controlling configuration of the workpiece support fixture.

That is, different angular profiles can be defined along the curved, upper surface of different sets of headers.

In other embodiments, the workpiece may be held in place with any suitable attraction force that is appropriate for the workpiece being worked upon. For example, the attraction force may be a magnetic force when the workpiece is made of a material that may be attracted to a magnetic force. In this embodiment, the attachment devices may include any suitable electromagnets. The electromagnets that extend beyond the end of the workpiece need not be removed. Instead, the electromagnets that extend beyond the end of the workpiece may simply remain in place.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
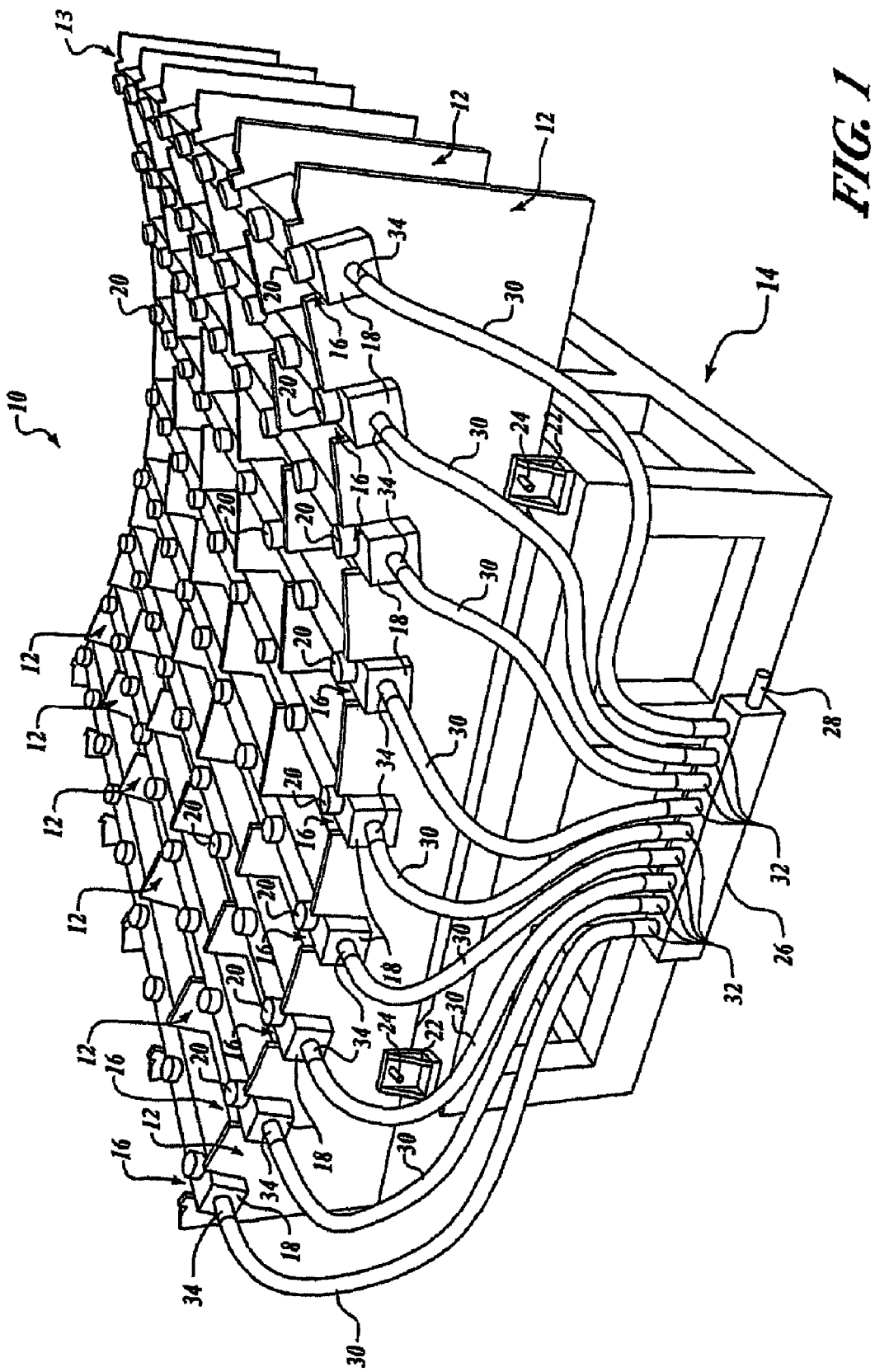
FIG. 1 is a perspective view of an exemplary reconfigurable workpiece support fixture according to an embodiment of the invention.

Referring to FIG. 1, an exemplary embodiment of a reconfigurable workpiece support fixture 10, given by way of non-limiting example, is reconfigurable to support a variety of workpieces (not shown) of different sizes and configurations during manufacturing, fabrication, assembly operations, or the like. Through use of modular concepts, the exemplary reconfigurable workpiece support fixture 10 advantageously may be built more simply, may be more flexible, and may be modified for different configurations more quickly than known fixtures. Moreover, the exemplary reconfigurable workpiece support fixture 10 may be used to support determinant assembly operations, if desired.

By way of overview and still referring to FIG. 1, parallel headers 12 are attached to a base 14. Each header 12 is a flat, substantially planar plate that defines notches 16 along an angular profile, such as an arc. A manifold 18 is received in each of the notches 16 such that the manifolds 18 are parallel to each other and perpendicular to the planes of the headers 12. Each manifold 18 spans across the headers 12 and includes attachment devices 20, such as removable suction cups. A workpiece (not shown) is placed on the suction cups 20 and vacuum is applied to each of the manifolds 18. The workpiece and the manifolds 18 are drawn toward each other, and the manifolds 18 engage sides of the notches, thereby causing the manifolds 18 to be held in place. The configuration of the fixture 10 may be changed by use of different headers 12 that define different numbers of notches 16 and/or define different angular profiles, or by use of different numbers of suction cups 20 along the manifolds 18, or by use of different numbers of manifolds 18 as desired. Details of construction and operation of the fixture 10 will be explained below. Other embodiments will also be explained.

The base 14 includes blocks 22, such as angle irons. The blocks 22 are spaced at intervals along sides of the base 14. Each block 22 defines a substantially flat face. Each block 22 defines a female receptacle for receiving therein a fastener 24, such as a pin. Similarly, each header 12 defines a hole that corresponds to location of the female receptacle defined in a corresponding block 22. The header 12 is placed against the blocks 22 so the hole in the header 12 lines up with the female receptacles in the blocks 22. The fastener 24 is placed in the female receptacles in the blocks 22 and through the hole in the header 12, thereby pinning the header 12 to the base 14.

A vacuum distribution manifold 26 is attached to the base 14. An inlet port 28 is provided for connecting the vacuum distribution manifold 26 to a vacuum source (not shown). Vacuum hoses 30 are connected at one end 32 to outlet ports (not shown) of the vacuum distribution manifold 26 and at another end 34 to the manifolds 18.

Each header 12 is a flat, substantially planar plate. The notches 16 are defined, such as by machining, along and normal to a curved, upper surface of each header 12. The curved, upper surface of the header 12 defines an angular profile, such as an arc as shown in FIG. 1, that corresponds to a profile of a particular workpiece that is to be machined on the fixture 10. It is the profile of the headers 12 that corresponds to the profile of the workpiece. That is, the headers 12 control configuration of the fixture 10 to correspond to the profile of the workpiece. In corresponding to the profile of the workpiece, the upper surface of the header 12 may have any shape as desired for a particular application. For example, a workpiece may have a built-up section, such as an edge that is thicker than other parts of the workpiece. In such a case, then a notch or other similar depression, such as clearance depression 13, may be cut out of the part of the upper surface of the header 12 to provide relief to the corresponding built-up area of the workpiece.

Width capacity of the fixture 10 to accommodate workpieces of different configurations is simply and easily changed by use of different headers 12 that define different numbers of notches 16. In addition, the angular profile along the curved, upper surface of the headers 12 contributes to controlling configuration of the fixture 10. That is, different angular profiles can be defined along the curved, upper surface of different sets of headers 12. Each set of headers 12 with the same angular profile corresponds to a profile of a desired workpiece. By changing sets of headers 12 from one set of headers 12 with one angular profile to another set of headers 12 with another angular profile, configuration of the fixture 10 can be changed to accommodate different workpieces with different angular profiles.

Alternately, if desired, width capacity of the fixture 10 to accommodate workpieces of configurations with different widths but with a same angular profile is simply and easily changed by merely using the number of the manifolds 18 as desired to fit within edges of a workpiece to be supported. The manifolds 18 may simply be placed in the corresponding notches 16 as desired for a particular workpiece. If the angular profile of the upper surface of the header 12 is substantially uniform, then the manifolds 18 may be placed in the notches 16 anywhere along the angular profile as desired. That is, in such a case, the manifolds 18 need not uniformly populate the notches 16 from a central notch 16 outwardly toward the notches 16 toward ends of the headers 12. For example, in FIG. 2, an unpopulated notch 17 does not support a manifold 18. However, in some other cases it may be desirable to uniformly populate the notches 16 from a central notch 16 outwardly toward the notches 16 toward ends of the headers 12. Regardless, the manifolds 18 may simply be placed in the corresponding notches 16 as desired for a particular workpiece.

The manifolds 18 communicate vacuum to the suction cups 20. Each manifold 18 is a substantially rectangular box that spans across all of the headers 12. Each manifold 18 is slid or placed freely in its corresponding notches 16 along the curved, upper surface of the headers 12. One end of each manifold 18 defines an inlet port (not shown) that is connected to the end 34 of one of the vacuum hoses 30. Another end of each manifold 18 is sealed shut (that is, vacuum-tight). As a result, the manifold 18 is placed in the notches 16 with the "inlet port" end of the manifold 18 placed toward the vacuum distribution manifold 26 for connection with the hoses 30.

A series of receptacles such as holes or pockets or the like (not shown in FIG. 1) are defined along a top side of each manifold 18 between the ends of the manifold 18. Each receptacle is lined with a seal, such as an O-ring (not shown). A suction cup 20 sits loosely on top of the receptacle in sealing engagement with the seal. Advantageously, the suction cups 20 may be any commercial, off-the-shelf (COTS) suction cup that is readily available, as desired. Given by way of nonlimiting example, a suitable suction cup is the "Flip-Pod", Part No. 84408, available from Horst Witte Geratebau Barskamp of Bleckede, Germany. If the workpiece has a built-up area such as a thicker edge as described above, then the suction cups 20 on the manifolds 18 at the edge of the workpiece may be shorter than the rest of the suction cups 20. The shortened suction cups 20 at the edge of the workpiece may be made simply by cutting down the same type of suction cup used for the remainder of the suction cups 20. Alternately, an adjustable height suction cup may be used, such as the "Height Adjustable Flip-Pod", Part No. 90860, available from Horst Witte Geratebau Barskamp of Bleckede, Germany.

Length capacity of the fixture 10 is easily controlled by varying the number of the suction cups 20 that are placed on the manifolds 18. That is, if holding a workpiece or part does not require suction along the full length of the manifolds 18, then the suction cups 20 that extend beyond the end of the workpiece are removed and the receptacle is sealed with receptacle cover, such as a flat piece of material (such as plastic, sheet metal, or the like) that is placed in sealing engagement across the seal. As a result, configuration of the fixture 10 advantageously is controlled in part simply by use of COTS suction cups and receptacle covers such as flat pieces of plastic or metal. Advantageously and as a result, same-sized manifolds 18 can be used across several different configurations of the fixture 10 as desired for fabricating or machining any number of different workpieces, as desired.

An advantageous feature of the fixture 10 is engagement of the manifolds 18 and the notches 16 for holding together the manifolds 18 and the headers 12. As discussed above, the angular profile defined by the curved, upper surface of the header 12 corresponds to the profile of the particular workpiece that is to be machined on the fixture 10. The manifolds 18 rest in the notches 16 that have been defined normal to the curved, upper surface of the headers 12. The workpiece is placed on top of the suction cups 20, and suction is applied to the suction cups 20 from the vacuum source via the vacuum distribution manifold 26, the vacuum hoses 30, and the manifolds 18. Weight of the workpiece causes the workpiece to be gravitationally urged downwardly toward the manifolds 18. In addition, suction causes the manifolds 18 to be urged upwardly toward the workpiece.

Advantageously, as the manifolds 18 are urged upwardly toward the workpiece, the manifolds 18 engage sides of the notches 16 (except for the notch 16 at the center of the header 12 as described below) that are defined at an angle relative to the relative motion between the workpiece and the manifolds 18, thereby holding the manifolds 18 to the headers 12. As a result, a clamping force between the headers 12 and the manifolds 18 advantageously is created without use of any mechanical clamping or anchoring devices whatsoever. It will be noted that the notch 16 at the center of the header 12 is aligned with gravitational urging of the workpiece and a direction of attraction of the manifold 18 toward the workpiece due to suction. As a result, the manifold 18 travels upwardly in a direction aligned with sides of the notch 16 at the center of the header without engagement.

Figure 2:
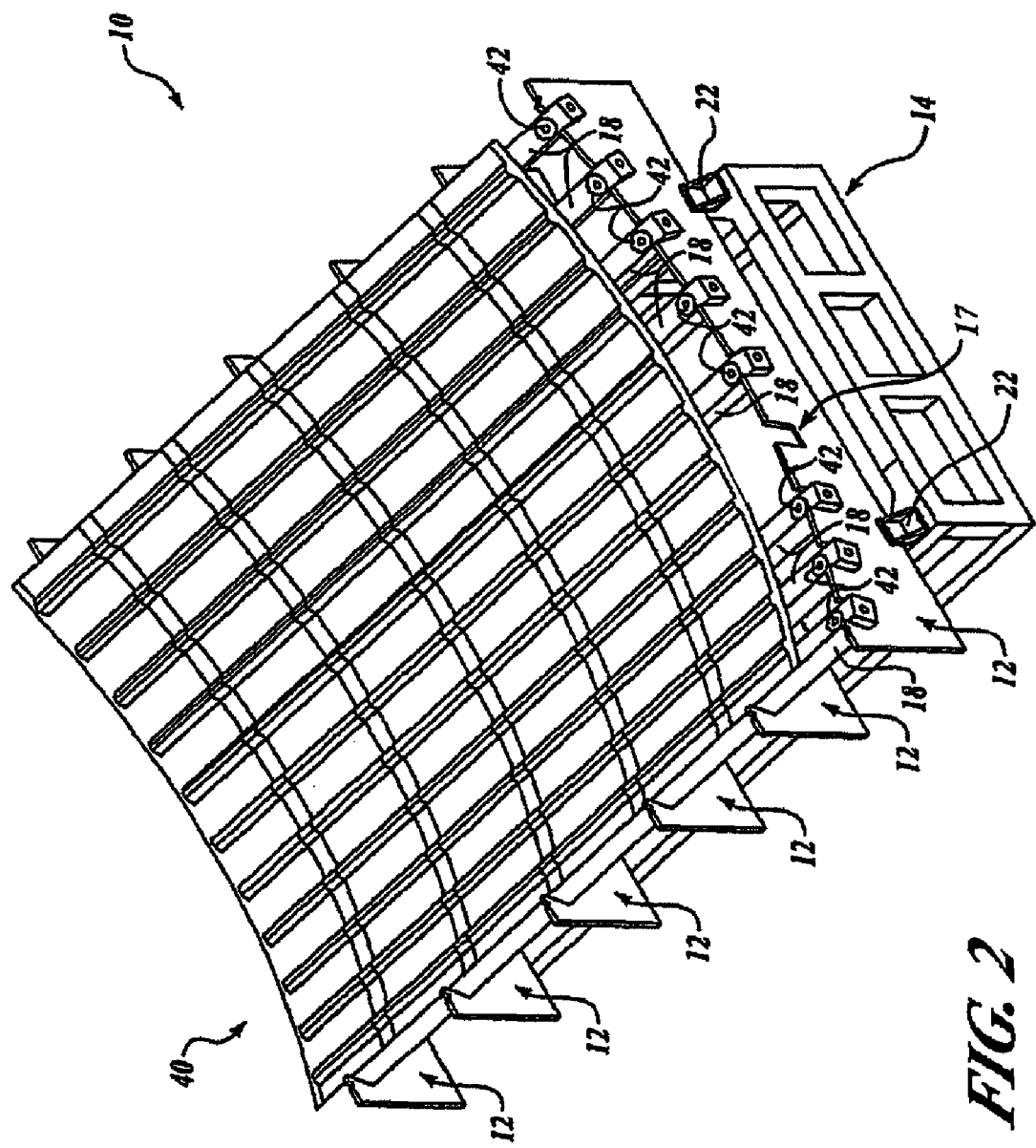
FIG. 2 is a perspective view of a workpiece supported by the reconfigurable workpiece support fixture of FIG. 1.

Referring now to FIG. 2, a workpiece 40 is supported by the reconfigurable workpiece support fixture 10. The reconfigurable workpiece support fixture 10 is seen from the opposite end as in FIG. 1. To that end, FIG. 2 does not show the vacuum distribution manifold 26 and the vacuum hoses 30. Given by way of non-limiting example, the workpiece 40 may be a fuselage skin for an aircraft. However, the workpiece 40 may be any workpiece as desired. For example, the workpiece 40 may be a wing skin for an aircraft; a vehicle panel such as a roof top, a trunk lid, a hood, a door, or the like; or any workpiece as desired for a particular application.

In this non-limiting example, the workpiece 40 extends across all of the manifolds 18 but does not span all the receptacles (not shown) of the manifolds 18. Therefore, receptacle covers 42 (described above) sealingly engage seals (not shown) and seal the receptacles that extend beyond the edge of the workpiece 40.

Figure 3:
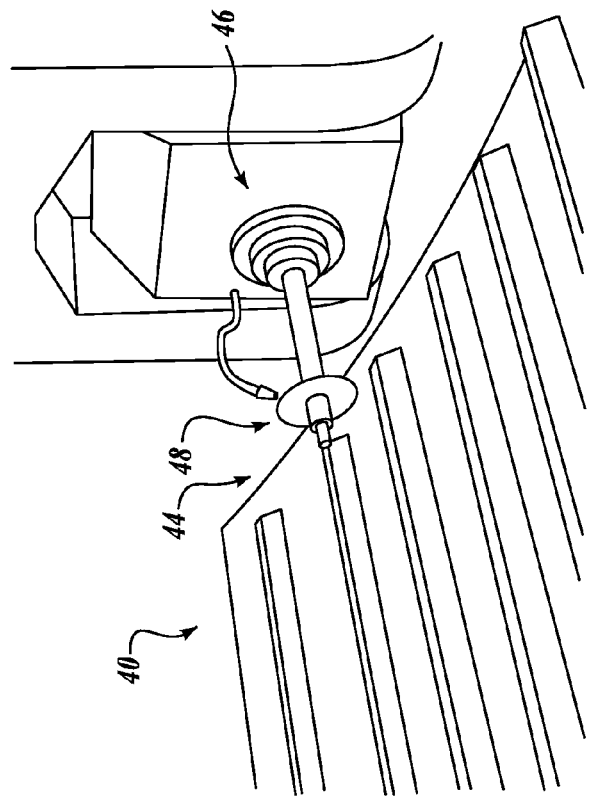

Referring now to FIG. 3, the workpiece 40 is supported by the reconfigurable workpiece support fixture 10. An end 44 of the workpiece 40 is trimmed with a cutting device 46 having a blade 48. The blade 48 trims the end 44 at a safe distance beyond the ends of the manifolds 18 (at the ends of the manifolds 18 that are not connected to the vacuum hoses 30.

Figure 4:
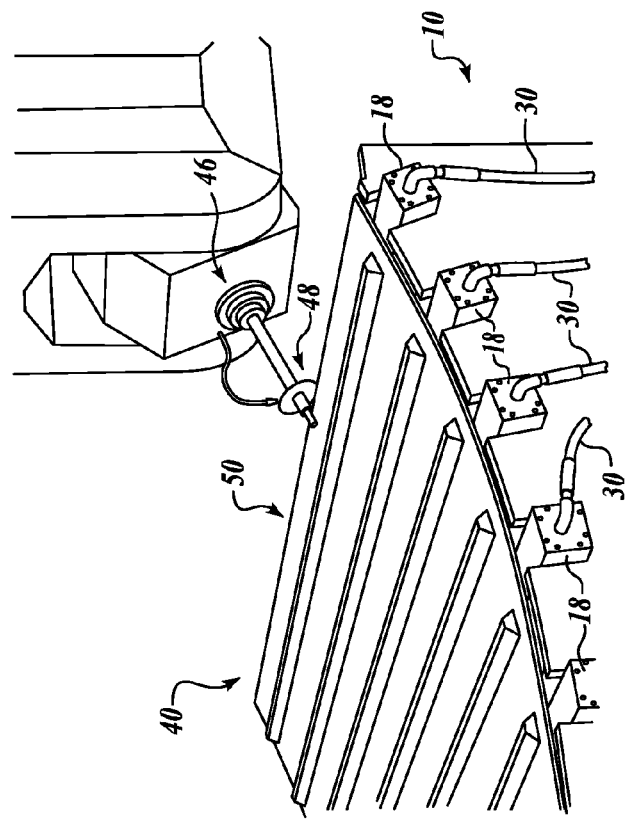
FIGS. 3 and 4 are perspective views of machining operations being performed on a workpiece supported by the reconfigurable workpiece support fixture of FIG. 1.

Referring now to FIG. 4, the workpiece 40 is supported by the reconfigurable workpiece support device 10. An edge 50 of the workpiece 40 is trimmed with the blade 48 of the cutting device 46. The blade 48 trims the edge 50 at a safe distance beyond the ends of the headers 12. Other types of "machining" operations suitably include drilling and edge profiling. Routing, grinding, and polishing can also be performed by using different types of "cutters" in the spindle of the machine. The workpiece support fixture 10 can be used to support work for either a conventional multi-axis machine or a manufacturing robot as desired for a specific application. The workpiece support fixture 10 can also support determinant assembly operatons.

Figure 5:
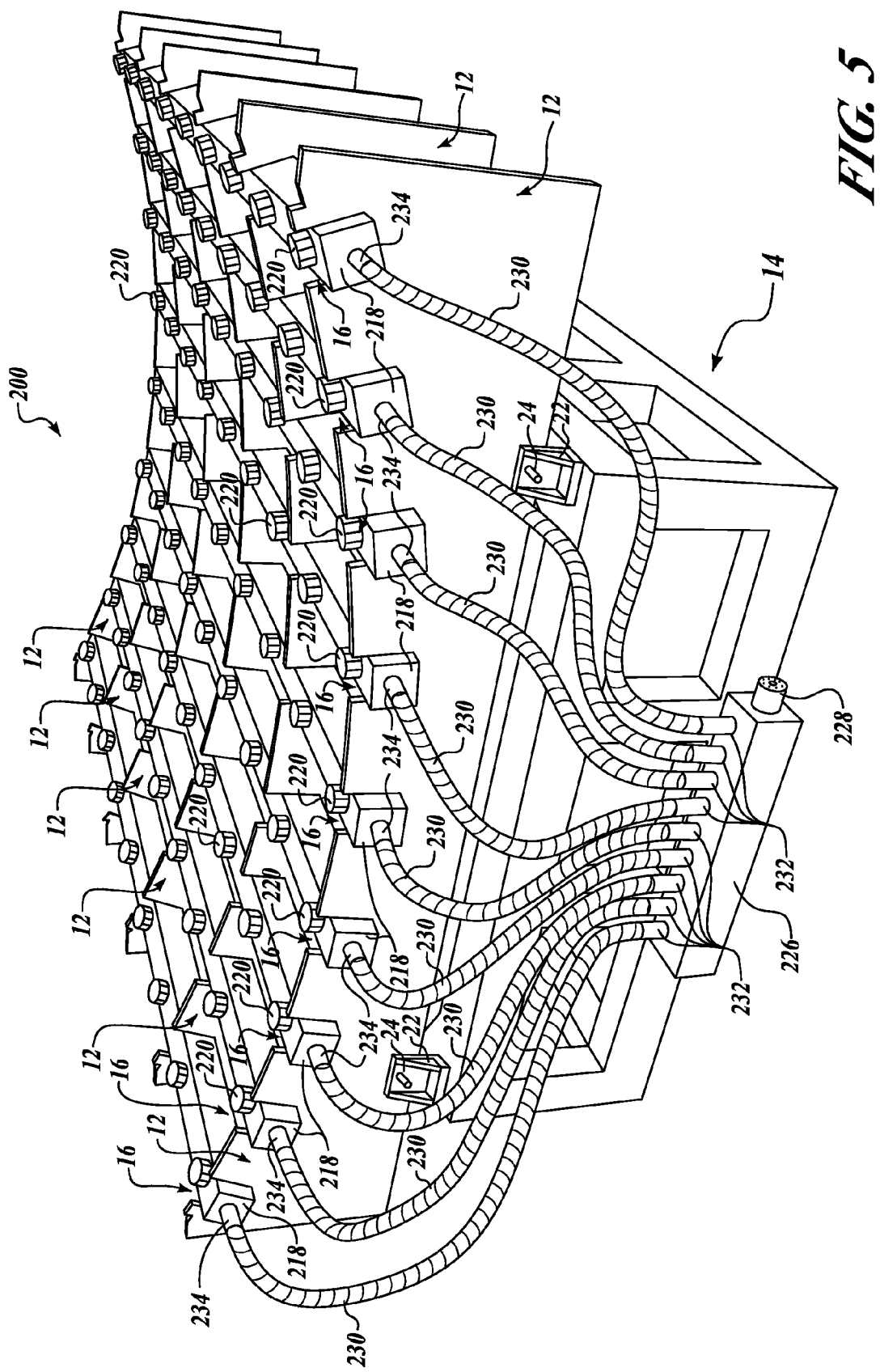
FIG. 5 is a perspective view of an exemplary reconfigurable workpiece support fixture according to another embodiment of the invention.

In other embodiments, the workpiece may be held in place with any suitable attraction force that is appropriate for the workpiece being worked upon. For example, the attraction force may be a magnetic force when the workpiece is made of a material that may be attracted to a magnetic force. Referring now to FIG. 5, an exemplary reconfigurable workpiece support fixture 200 according to another nonlimiting embodiment includes attachment devices 220. The attachment devices 220 may include any suitable electromagnets. The electromagnets 220 are electrically connected to an electrical source (not shown) as desired to attach the workpiece to the reconfigurable workpiece support fixture 200. In one non-limiting embodiment, an electrical junction box 226 is attached to the base 14. An input jack 228 is provided for electrically connecting the electrical junction box 226 to the electrical source (not shown). Wires or cables 230 are electrically connected at one end 232 to output jacks (not shown) of the electrical junction box 226 and at another end 234 to manifolds 218. The electromagnets 220 are electrically coupled to receive electrical power from the electrical connection between the end 234 of the wire or cable 230 and the manifold 218. In this embodiment, the electromagnets 220 that extend beyond the end of the workpiece advantageously need not be removed. Instead, the electromagnets 220 that extend beyond the end of the workpiece may simply remain in place. All other details of construction and operation of the reconfigurable workpiece support fixture 200 are the same as those for the reconfigurable workpiece support fixture 10 (FIG. 1) and need not be repeated.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method of supporting a workpiece on a workpiece support fixture, the method comprising:
   removably attaching a plurality of spaced-apart plates to a base, each plate defining a plurality of notches in an edge of the plate;
   receiving a plurality of spaced-apart manifolds in the plurality of notches, each manifold spanning across the plurality of plates and each manifold being free to move within the plurality of notches in a direction toward the edge;
   removably attaching a plurality of attachment devices to the plurality of manifolds, the plurality of spaced-apart plates being free of any of the plurality of attachment devices; and
   removably attaching a workpiece to the plurality of attachment devices.

2. The method of claim 1, wherein removably attaching the workpiece includes generating an attraction force between the plurality of manifolds and the workpiece.

3. The method of claim 2, further comprising:
   abutting each manifold against a side of the notch in which the manifold is received.

4. The method of claim 2, wherein the attraction force includes one of a suction force and a magnetic force.

5. The method of claim 1, wherein removably attaching a plurality of spaced-apart plates to a base comprises:
   removably fastening the plurality of spaced-apart plates to the base.

6. The method of claim 1, wherein each manifold of the plurality of spaced-apart manifolds has a plurality of spaced-apart receptacles that are configured to removably receive an attachment device of the plurality of attachment devices, and further comprising:
   removably attaching the plurality of attachment devices to selected ones of the plurality of spaced-apart receptacles.

7. The method of claim 6, further comprising:
   sealing receptacles of the plurality of spaced-apart receptacles that do not have an attachment device removably attached thereto.

8. The method of claim 1, further comprising:
   providing at least one clearance depression on the edge of at least one of the plurality of spaced-apart plates to accommodate a built-up portion of the workpiece.

9. A method of reconfiguring a workpiece support fixture, the method comprising:
   removably attaching a plurality of first spaced-apart plates to a base, each of the first spaced-apart plates defining a plurality of first notches in an edge of the plate;
   receiving a plurality of spaced-apart manifolds in the plurality of first notches, each manifold spanning across the plurality of first spaced-apart plates, each manifold defining a plurality of spaced-apart receptacles and each manifold being free to move within the plurality of first notches in a direction toward the edge;
   removably attaching a plurality of attachment devices to the plurality of manifolds in receptacles that are positioned within ends of a workpiece to be supported the plurality of spaced-apart plates being free of any of the plurality of attachment devices; and
   sealing any of the receptacles that are positioned beyond the ends of the workpiece.

10. The method of claim 9, further comprising:
    removably attaching a plurality of second spaced-apart plates to the base, each of the second spaced-apart plates defining a plurality of second notches along an edge of the plate, the edges of the second spaced-apart plates defining a second angular profile that is different from a first angular profile defined by edges of the first spaced-apart plates.

11. The method of claim 10, further comprising:
    removing the plurality of first spaced-apart plates from the base prior to removably attaching the plurality of second spaced-apart plates to the base.

12. The method of claim 11, further comprising:
    removably attaching a plurality of attachment devices to the plurality of manifolds in receptacles that are positioned within ends of a second workpiece to be supported; and
    sealing any of the receptacles that are beyond the ends of the second workpiece.

13. A method of supporting a workpiece on a workpiece support fixture, the method comprising:
    removably attaching a plurality of spaced-apart plates to a base, each plate of the plurality of spaced-apart plates having a plurality of notches in an edge of the plate that is configured to support the workpiece;
    receiving a plurality of manifolds in the plurality of notches, each manifold of the plurality of manifolds being received in one notch of the plurality of notches in at least two of the plurality of spaced-apart plates and spanning across the at least two of the plurality of spaced-apart plates and each manifold being free to move within the plurality of notches in a direction toward the edge;
    removably attaching a plurality of attachment devices to the plurality of manifolds the plurality of spaced-apart plates being free of any of the plurality of attachment devices; and
    removably attaching a workpiece to the plurality of attachment devices.

14. The method of claim 13, wherein removably attaching a plurality of spaced-apart plates to a base, comprises removably fastening the plurality of spaced-apart plates to the base.

15. The method of claim 13, further comprising:
    abutting each manifold of the plurality of manifolds against a side of the notch in which the manifold is received.

16. The method of claim 13, wherein removably attaching a workpiece to the plurality of attachment devices, comprises:
    generating an attraction force between the plurality of manifolds and the workpiece.

17. The method of claim 13, wherein each manifold of the plurality of manifolds has a plurality of spaced-apart receptacles that are configured to removably receive an attachment device of the plurality of attachment devices, and further comprising:
   sealing receptacles of the plurality of spaced-apart receptacles that do not have an attachment device received thereby.

18. The method of claim 13, and further comprising:
   providing at least one clearance depression on the edge of at least one of the plurality of spaced-apart plates to accommodate a built-up portion of the workpiece.

19. The method of claim 18, further comprising:
   affixing selected attachment devices of the plurality of attachment devices to the plurality of manifolds at positions on the plurality of manifolds corresponding to the clearance depression on the edge of the at least one of the plurality of spaced-apart plates that are shorter than other attachment devices of the plurality of attachment devices that are affixed to the plurality of manifolds at other positions on the plurality of manifolds.

* * * * *